United States Patent
Nishikigi et al.

[11] Patent Number: 5,904,585
[45] Date of Patent: May 18, 1999

[54] ROTARY CONNECTOR

[75] Inventors: Kenichiro Nishikigi; Yoshihiro Ohashi; Nobuo Matsuzaki, all of Miyagi-ken, Japan

[73] Assignee: Alps Electric Co., Ltd., Japan

[21] Appl. No.: 08/788,810

[22] Filed: Jan. 23, 1997

[30] Foreign Application Priority Data

Jan. 25, 1996 [JP] Japan .................................. 8-010958

[51] Int. Cl.⁶ ............................................... H01R 35/04
[52] U.S. Cl. ............................................ 439/164; 439/15
[58] Field of Search ........................ 439/164, 15

[56] References Cited

U.S. PATENT DOCUMENTS

| | | | |
|---|---|---|---|
| 4,840,078 | 6/1989 | Shitanoki | 74/484 |
| 4,928,901 | 5/1990 | Bannai et al. | 242/85 |
| 5,529,505 | 6/1996 | Kuramoto et al. | 439/164 |
| 5,655,919 | 8/1997 | Ishikawa et al. | 439/164 |

*Primary Examiner*—Gary F. Paumen
*Attorney, Agent, or Firm*—Brinks Hofer Gilson & Lione

[57] ABSTRACT

A rotary connector is disclosed. In the rotary connector, a movable housing having a second top plate is rotatably connected to a fixed housing having a first top plate, and a part of the second top plate is overlapped on the first top plate. At the overlapping portion of the first and second top plates, a ring-shaped first projection projecting upward is formed on the inner periphery of the first top plate, and ring-shaped second and third projections each projecting downward are formed on the second top plate. The third projection is in abutment with the inner peripheral surface of the first top plate so as to serve as a rotary slide sections for the first and second housings, and the second projection is arranged outside of the third and first projections.

6 Claims, 2 Drawing Sheets

ROTARY CONNECTOR

BACKGROUND OF THE INVENTION

1. Field of the Invention

The present invention relates to a rotary connector for electrically connecting between a pair of housings, which are connected so as to be rotatable relative to each other, through a flexible cable.

2. Description of the Related Art

A rotary connector is briefly comprised of a pair of housings connected so as to be rotatable relative to each other, and a flexible cable wound around a storage section defined between the housings. Both ends of the flexible cable are electrically led out of each of the housings while being fixed thereto. One of the housings is used as a movable member and the other one is used as a stationary member. When the movable housing is rotated in both normal and reverse directions, the flexible cable is wound up or rewound in the storage section in accordance with the direction of rotation.

FIG. 5 is a vertical sectional view showing a conventional rotary connector. As shown in FIG. 5, a fixed housing 1 has a bottom plate 2 and a cylindrical member 3 which are integrated with each other, and a center hole 4 is formed in the center of the bottom plate 2. The cylindrical member 3 is provided with an outer cylinder 5 rising on the outer periphery of the bottom plate 2 and a first top plate 6 extending inwardly from the upper end of the outer cylinder 5. On the other hand, a movable housing 7 has an inner cylinder 8 and a second top plate 9 outwardly extending from the upper end thereof, and a stepped portion formed on the second top plate 9 overlaps the lower surface of the first top plate 6. A ring-shaped storage section 10 is defined between the housings 1 and 7, and a flexible cable 11 is, for example, spirally wound into the storage section 10. One end of the flexible cable 11 is led out of the housing 1 while being fixed to the outer cylinder 5, and the other end is led out of the movable housing 7 while being fixed to the inner cylinder 8.

The rotary connector thus briefly constructed is incorporated in a steering system of an automobile, and used as an electrical connecting means such as an air bag circuit or a horn circuit in such a manner that the fixed housing 1 is mounted to a combination switch which is a stator member of the steering system, and the movable housing is mounted to a handle which is a rotor member of the steering system. In the use of the rotary connector, when the handle is turned clockwise or counterclockwise, the turning force is transmitted to the movable housing 7 to rotate the movable housing 7 clockwise or counterclockwise. As a result, the flexible cable 11 is wound and tightened around the inner cylinder 8, or rewound around the outer cylinder 5, so that electrical connection between the housings 1 and 7 is maintained through the flexible cable 11 in both conditions.

In the conventional rotary connector, the second top plate 9 of the movable housing 7 overlaps the lower surface of the first top plate 6 inside the outer cylinder 5 of the fixed housing 1. Thus, even if external members such as column covers, etc. are arranged in the vicinity of the outer cylinder 5 upon incorporation in the steering system, the rotation of the movable housing 7 can be prevented from being interrupted by the external members. However, since a spacing S formed in the overlapping portion of the first and second top plates 6 and 9 is located on the upper surface of the rotary connector, foreign substances such as dust or an erroneously spilled beverage tend to enter the storage section 10 from the spacing S, whereby the connection reliability of the flexible cable 11 deteriorates.

In addition, when the foreign substance is a liquid such as a beverage, the liquid easily enters the storage section 10 from the spacing S by capillary action.

SUMMARY OF THE INVENTION

Accordingly, it is an object of the present invention to provide a rotary connector of high reliability by preventing the entry of foreign substances.

According to an aspect of the present invention, there is provided a rotary connector, comprising: a first housing having a first top plate; a second housing connected so as to be rotatable relative to the first housing, and having a second top plate overlapping the upper surface of the first top plate; and a flexible cable wound inside of the first and second housings, wherein a ring-shaped first projection projecting toward the lower surface of the second top plate is provided on the first top plate, and a ring-shaped second projection positioned radially outside of the first projection and projecting toward the upper surface of the first top plate is provided on the second top plate.

According to another aspect of the present invention, there is provided a rotary connector, comprising: a first housing having a first top plate; a second housing connected so as to be rotatable relative to the first housing, and having a second top plate overlapping the upper surface of the first top plate; and a flexible cable wound inside of the first and second housings, wherein a ring-shaped first projection projecting toward the lower surface of the second top plate is provided on the first top plate, a ring-shaped second projection projecting toward the upper surface of the first top plate is provided on the second top plate, and a space is provided between the first projection and the second projection.

DESCRIPTION OF THE PREFERRED EMBODIMENTS

The preferred embodiments of the present invention will be described with reference to the drawings.

Figure 1:
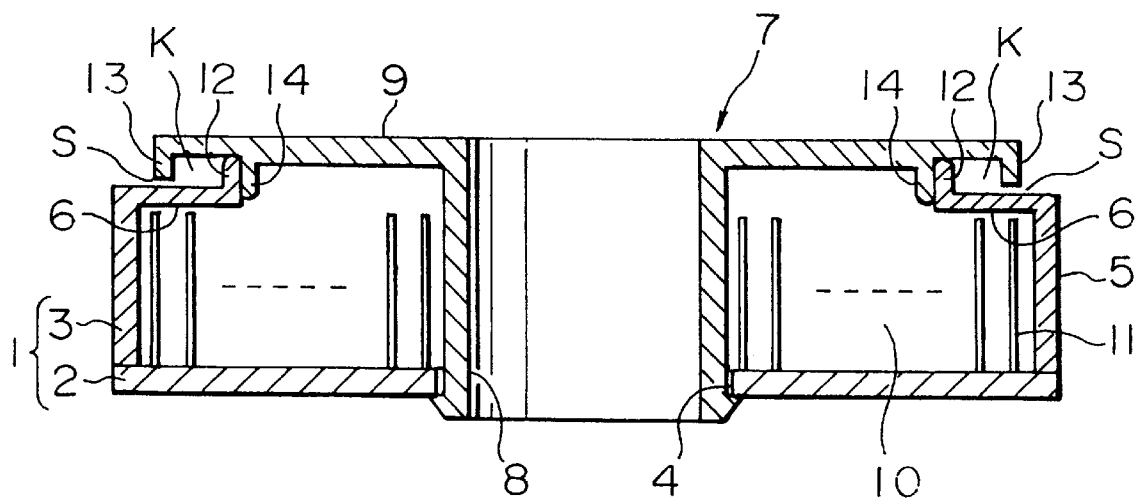
FIG. 1 is a vertical sectional view showing a first embodiment of a rotary connector according to the present invention.

Referring to FIG. 1, a fixed housing 1 has a bottom plate 2 and a cylindrical member 3 which are integrated with each other, and a center hole 4 is formed in the center of the bottom plate 2. The cylindrical member 3 has an outer cylinder 5 rising on the outer periphery of the bottom plate 2, and a first top plate 6 inwardly extending from the upper end of the outer cylinder 5. A ring-shaped first projection 12 projecting upward is formed on the inner periphery of the first top plate 6. On the other hand, a movable housing 7 has an inner cylinder 8 and a second top plate 9 outwardly extending from the upper end thereof. Ring-shaped second and third projections 13 and 14 projecting downward are formed on the second top plate 9. The third projection 14 is in contact with the inner peripheral surface of the first projection 12, and these first and third projections 12 and 14 serve as rotary slide sections for the housings 1 and 7. In addition, the second projection 13 is opposed to the upper surface of the first top plate 6 with a slight spacing S. On the overlapping portion of the first and second top plates 6 and 9, the third projection 14, the first projection 12 and the second projection 13 are concentrically arranged toward the outside.

The rotary connector shown in FIG. 1 is incorporated in a steering system of an automobile. Even if a foreign substance such as a beverage is erroneously spilled during usage, it is difficult for the foreign substance to enter the spacing S due to the presence of the second projection 13 drooping from the outer periphery of the second top plate 9 toward the upper surface of the first top plate 6. Should the foreign substance enter the inside of the second projection 13 from the spacing S, the foreign substance stays on the outside of the first and third projections 12 and 14 (i.e. the rotary slide sections for the housings 1 and 7) due to the presence of the first projection 12 rising on the first top plate 6 toward the lower surface of the second top plate 9. Therefore, there is little risk of the foreign substance entering the storage section 10 in which the flexible cable 11 is wound.

Figure 2:
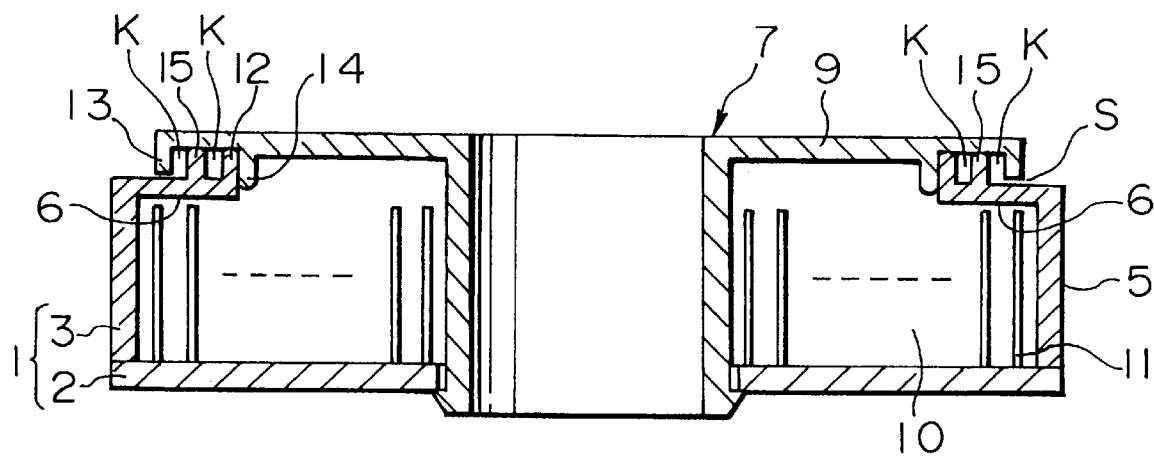
FIG. 2 is a vertical sectional view showing a second embodiment of the rotary connector according to the present invention.

According to a second embodiment shown in FIG. 2, a ring-shaped fourth projection 15 projecting toward the lower surface of the second top plate 9 is formed on the first top plate 6. The fourth projection 15 is located between the first projection 12 and the second projection 13, and blocks a foreign substance entering from the spacing S on the inside of the overlapping portion of the top plates 6 and 9 to make it difficult for the substance to reach the first and third projections 12 and 14 (i.e. rotary slide sections). A plurality of the fourth projections 15 may be formed for the purpose of enhancing the blocking effect of the foreign substance, although they are not illustrated.

According to the first and second embodiments shown in FIGS. 1 and 2, a space K is formed between the first projection 12 and the second projection 13. Thus, even if a liquid such as a beverage enters from the spacing S of the projection 13 side by capillary action, the liquid stays in the space K to be hard to reach the first projection 12, so that there is little risk of the liquid entering the storage section 10.

Figure 3:
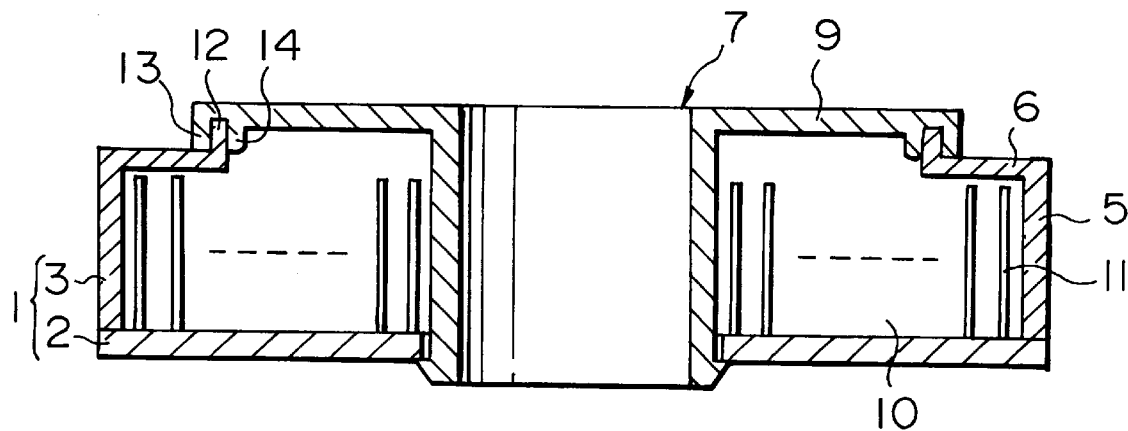
FIG. 3 is a vertical sectional view showing a third embodiment of the rotary connector according to the present invention.

According to a third embodiment shown in FIG. 3, the spacing between the second projection 13 and the third projection 14 both formed on the second top plate 9 is narrowed, and the first projection 12 formed on the first top plate 6 is fitted thereto, whereby all of the first to third projections 12, 13 and 14 serve as rotary slide sections of the housings 1 and 7.

Figure 4:
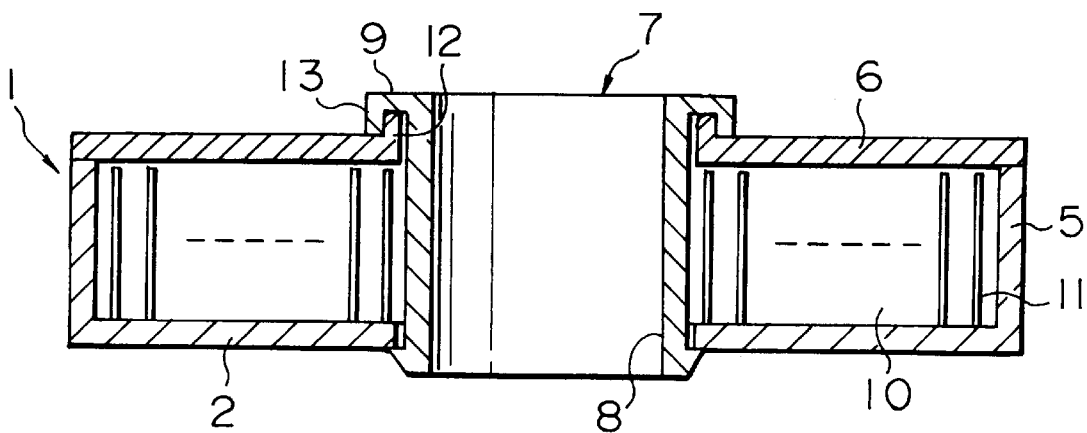
FIG. 4 is a vertical sectional view showing a fourth embodiment of the rotary connector according to the present invention.
Figure 5:
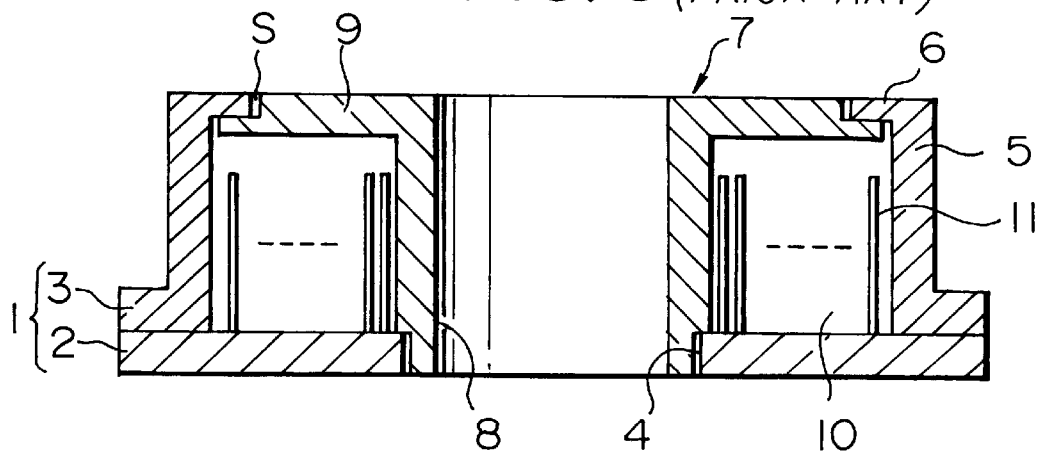
FIG. 5 is a vertical sectional view showing a conventional rotary connector.

According to a fourth embodiment shown in FIG. 4, almost entire top surface of the storage section 10 is covered with the first top plate 6, only the second projection 13 in contact with the outer peripheral surface of the first projection 12 is formed on the second top plate 9, and the third projection 14 is omitted. In this case, although the first and second projections 12 and 13 serve as the rotary slide sections for the housings 1 and 7, the entry of the foreign substance into the storage section 10 is securely prevented due to the presence of the second projection 13 drooping from the outer periphery of the second top plate and the first projection 12 rising from the first top plate 6. Although the outer cylinder 5 formed integrally with the bottom plate 2 is integrated with the first top plate 6, this construction may be adopted to the above-described first to third embodiments shown in FIGS. 1 to 3.

According to the above-described embodiments, the present invention offers the following advantages:

At the overlapping portion of the first top plate provided on the first housing and the second top plate provided on the second housing, the ring-shaped first projection projecting toward the upper second top plate is provided on the lower first top plate, and the ring-shaped second projection positioned radially outside of the first projection and projecting toward the first top plate is provided on the second top plate, whereby a foreign substance such as a beverage or dust can be securely blocked by the overlapping portion of the first and second top plates. Therefore, the foreign substance can be prevented from reaching the flexible cable provided in the storage section.

In addition, the ring-shaped third projection in contact with the inner peripheral surface of the first projection is provided on the second top plate, and the first and third projections are employed as sliding sections for the first and second housings, whereby the first projection may have the function of preventing the entry of the foreign substance and the function of the rotary slide section.

Further, the ring-shaped fourth projection located between the first projection and the second projection is provided on the first top plate, whereby the entry of the foreign substance can be prevented more securely.

Still further, at the overlapping portion of the first top plate provided on the first housing and the second top plate provided on the second housing, the ring-shaped first projection projecting toward the upper second top plate is provided on the lower first top plate, the ring-shaped second projection projecting toward the first top plate is provided on the second top plate, and a space is provided between the first projection and the second projection. Therefore, even if a foreign substance, particularly, a liquid enters from either of the first projection or the second projection, it becomes difficult for the liquid to reach other projection due to the presence of the space formed between these projections, so the entry of the liquid into the storage section of the rotary connector can be prevented.

What is claimed is:

1. A rotary connector, comprising:

a first housing having a first top plate;

a second housing connected so as to be rotatable relative to said first housing, and having a second top plate overlapping the upper surface of said first top plate;

a flexible cable wound inside of said first and second housings;

wherein a ring-shaped first projection projecting toward the lower surface of said second top plate is provided on said first top plate, and a ring-shaped second projection positioned radially outside of said first projection and projecting toward the upper surface of said first top plate is provided on said second top plate; and wherein a ring-shaped third projection in contact with the inner peripheral surface of said first projection is provided on said second top plate, and said first and second housings rotate relative to each other, employing said first and third projections as sliding sections.

2. The rotary connector of claim 1, wherein a ring-shaped fourth projection located between said first projection and said second projection is provided on said first top plate.

3. A rotary connector, comprising:

a first housing having a first top plate;

a second housing connected so as to be rotatable relative to said first housing, and a second top plate overlapping the upper surface of said first top plate;

a flexible cable wound inside of said first and second housings;

wherein a ring-shaped first projection projecting toward the lower surface of said second top plate is provided on said first top plate, and a ring-shaped second projection positioned radially outside of said first projection and projecting toward the upper surface of said first top plate is provided on said second top plate; and wherein a ring-shaped third projection located between said first projection and said second projection is provided on said first top plate.

4. A rotary connector comprising:

a first housing having a first top plate;

a second housing connected so as to be rotatable relative to said first housing, and having a cylindrical member and a second top plate overlapping the upper surface of said first top plate;

a flexible cable wound inside of said first and second housings;

wherein a ring-shaped first projection projecting toward the lower surface of said second top plate is provided on said first top plate, a ring-shaped second projection toward the upper surface of said first top plate is provided on said second top plate, and a space is provided between said first projection and said second projection; and wherein said first top plate is spaced radially outwardly from said cylindrical member.

5. A rotary connector, comprising:

a first housing having a first top plate;

a second housing connected so as to be rotatable relative to said first housing, and having a cylindrical member and a second top plate overlapping the upper surface of said first top plate;

a flexible cable wound inside of said first and second housings;

wherein a ring-shaped first projection projecting toward the lower surface of said second top plate is provided on a radially inside end of said first top plate, and a ring-shaped second projection positioned radially outside of said first projection and projecting toward the upper surface of said first top plate is provided on said second top plate; and wherein said first top plate is spaced radially from said cylindrical member.

6. A rotary connector, comprising:

a first housing having a first top plate;

a second housing connected so as to be rotatable relative to said first housing, and having a cylindrical member and a second top plate overlapping the upper surface of said first top plate;

a flexible cable wound inside of said first and second housings;

wherein a ring-shaped first projection project toward the lower surface of said second top plate is provided on a radially inside end of said first top plate, a ring-shaped second projection projecting toward the upper surface of said first top plate is provided on said second top plate, and a space is provided between said first projection and said second projection; and wherein said first top plate is spaced radially outwardly from said cylindrical member.

* * * * *

UNITED STATES PATENT AND TRADEMARK OFFICE
CERTIFICATE OF CORRECTION

PATENT NO. : 5,904,585
DATED : May 18, 1999
INVENTOR(S) : Kenichiro Nishikigi et al.

It is certified that error appears in the above-indentified patent and that said Letters Patent is hereby corrected as shown below:

On the Title Page

In column 2, line 11, under "ABSTRACT", replace "sections" with --section--.

Signed and Sealed this

Thirtieth Day of November, 1999

Q. TODD DICKINSON

Attest:

Attesting Officer

Acting Commissioner of Patents and Trademarks